(12) United States Patent
Skok et al.

(10) Patent No.: US 8,450,022 B2
(45) Date of Patent: May 28, 2013

(54) FUEL CELL HYBRID POWER GENERATION SYSTEM AND METHOD FOR GAS DISTRIBUTION SYSTEMS

(75) Inventors: Andrew Skok, Monroe, CT (US); David Jonathan Teichroeb, Ontario (CA)

(73) Assignees: FuelCell Energy, Inc., Danbury, CT (US); Enbridge, Inc., Alberta (CA)

( * ) Notice: Subject to any disclaimer, the term of this patent is extended or adjusted under 35 U.S.C. 154(b) by 0 days.

(21) Appl. No.: 13/330,308

(22) Filed: Dec. 19, 2011

(65) Prior Publication Data

US 2012/0151920 A1 Jun. 21, 2012

Related U.S. Application Data

(63) Continuation of application No. 11/435,054, filed on May 16, 2006, now Pat. No. 8,080,344.

(51) Int. Cl.
*H01M 8/04* (2006.01)
*F01K 13/00* (2006.01)

(52) U.S. Cl.
USPC .............................. 429/440; 429/436; 60/645

(58) Field of Classification Search
USPC ..................................... 429/436, 440; 60/645
See application file for complete search history.

(56) References Cited

U.S. PATENT DOCUMENTS

| | | |
|---|---|---|
| 3,615,839 A | 10/1971 | Thompson et al. |
| 4,693,945 A | 9/1987 | Ohyauchi et al. |
| 4,923,768 A | 5/1990 | Kaneko et al. |
| 5,139,894 A | 8/1992 | Mizuno et al. |
| 5,968,680 A * | 10/1999 | Wolfe et al. .................... 429/425 |
| 6,013,385 A | 1/2000 | DuBose |
| 6,017,646 A | 1/2000 | Prasad et al. |
| 6,294,277 B1 | 9/2001 | Ueno et al. |
| 6,878,362 B2 | 4/2005 | Kumar et al. |
| 2001/0003247 A1 * | 6/2001 | Lundberg ........................ 60/648 |
| 2002/0081469 A1 | 6/2002 | Nomura et al. |

(Continued)

FOREIGN PATENT DOCUMENTS

| | | |
|---|---|---|
| JP | 8-121699 A | 5/1996 |
| JP | 2004-303649 A | 10/2004 |
| JP | 2005-240863 A | 9/2005 |

OTHER PUBLICATIONS

The Cryostar Magazine, No. 3, Spring 2004, pp. 1-12.

(Continued)

*Primary Examiner* — Patrick Ryan
*Assistant Examiner* — Muhammad Siddiquee
(74) *Attorney, Agent, or Firm* — Cowan, Liebowitz & Latman, P.C.

(57) ABSTRACT

A method for use with a gas distribution system in which a higher pressure gas is transported/distributed and reduced to a lower pressure gas for a gas distribution or transmission line, the method comprising pre-heating the higher pressure gas before it is reduced in pressure, using an energy recovery generator to generate electricity using the pre-heated higher pressure gas while reducing the gas pressure to a lower gas pressure, using a fuel cell power plant to generates electricity while producing heat that is used to pre-heat high pressure gas, and combining the electrical outputs of the energy recovery generator and the fuel cell power plant to generate a combined electrical output. The method also comprises the fuel cell power plant making the waste heat available to the gas pre-heater without using a combustion unit thereby increasing the system's electrical efficiency.

9 Claims, 4 Drawing Sheets

U.S. PATENT DOCUMENTS

| | | | |
|---|---|---|---|
| 2004/0157094 | A1 | 8/2004 | Reiser et al. |
| 2004/0166389 | A1 | 8/2004 | Matsuoka et al. |
| 2005/0058863 | A1* | 3/2005 | Wang et al. ............... 429/26 |
| 2005/0100851 | A1 | 5/2005 | Scholten et al. |
| 2005/0198963 | A1 | 9/2005 | Wai et al. |
| 2005/0255354 | A1 | 11/2005 | Yamasaki |
| 2006/0141331 | A1* | 6/2006 | Reiser et al. ............... 429/38 |
| 2007/0099057 | A1* | 5/2007 | Ferrall et al. ............... 429/34 |

OTHER PUBLICATIONS

Fuel Cells Bulletin, Elsevier Advanced Technology, Kidlington, GB, vol. 2005, No. 9, Sep. 1, 2009, p. 9 "FCE, Enbridge in 'ultra-clean' hybrid power plant deal" XP005082240.

The above US Publication # 1 and 5 were cited in a Oct. 21, 2010 Chinese Office Action, which is enclosed with an English Translation, that issued in counterpart Chinese Patent Application No. 200780023802.2.

The above article # 2 was the Supplementary European Search Report in Application No. EP 07783587.4 dated May 6, 2010, which is enclosed.

The above US Patent # 3 and US Publication # 3 and 7 were cited in a Mar. 3, 2011 Australian Office Action which is enclosed, that issued in Australian Patent Application No. 2007253925.

The above US Patent # 3 and US Publication # 3 and 7 were cited the International Search Report of PCT/US07/68673, Feb. 13, 2008, which is enclosed.

The above references were a Oct. 26, 2012 Japanese Office Action, which is enclosed without an English Translation, that issued in Japanese Patent Application No. 2009-511170.

* cited by examiner

FUEL CELL HYBRID POWER GENERATION SYSTEM AND METHOD FOR GAS DISTRIBUTION SYSTEMS

CROSS-REFERENCE TO RELATED APPLICATION

This application is a continuation of application Ser. No. 11/435,054 filed on May 16, 2006 now U.S. Pat. No. 8,080,344, the entire disclosure of which is hereby incorporated by reference.

BACKGROUND OF THE INVENTION

This invention relates to fuel cell systems and, in particular, fuel cell hybrid power plant systems and methods for gas distribution systems.

In conventional gas distribution systems, the natural gas being supplied by utilities such as, for example, Enbridge, Inc., an assignee of the subject application, is carried over extra-high pressure transmission and distribution pipelines. This extra-high pressure gas is reduced in pressure for distribution at a lower pressure which is typically 50-80 psig from an upstream pressure which is usually in the range of two to twenty times higher than the downstream pressure. These extra-high pressure pipelines deliver gas to city gate stations, or within urban centers, to district stations, which reduce the gas pressure so that the gas can then be distributed at lower pressures to natural gas users or consumers. The city gate or district stations are usually referred to as "pressure let down stations," or "pressure reducing stations" and they must provide the necessary reduction of the extra-high pressure gas to the desired lower pressures.

The reduction in gas pressure is typically accomplished at each pressure let down station through pressure reducing valves. Accompanying the reduction in pressure is a refrigerant effect attributable to constant enthalpy expansion. This effect is similar to the cooling experienced when any gaseous compound (propane, compressed air, etc.) experiences a combination of significant pressure reduction and high volumetric flows. A physical manifestation of this can be noticed with the operation of a propane barbeque, where propane under pressure in the storage cylinder experiences a pressure reduction when the gas exits the cylinder. Under high flow conditions this refrigerant effect produces a cold exterior on the storage cylinder, which under extreme conditions can result in frost accumulating on the cylinder.

As above-stated, the same chilling or refrigerant effect occurs on natural gas pipelines where large gas flows undergo significant pressure drops. This cooling effect on gas pipelines is undesirable as it can cause heavy frost formation which can negatively affect pipeline system integrity and/or create movement of pavement near any pipelines which are within municipal road allowances. This significant cooling can also create control problems with hydrates (moisture) in the conveyed gas or fuel. To eliminate these concerns, gas utilities typically pre-heat the extra-high pressure gas before it is delivered to the pressure let down stations. This is usually accomplished by passing the gas through a pre-heater or heat exchanger having a thermal heat transfer fluid loop (typically a glycol loop) which is supplied heat via natural gas boilers. The heated heat fluid of the heat transfer fluid loop of the pre-heater heats the extra-high pressure gas sufficiently so that as its pressure is reduced in the let down station, the temperature of the gas is maintained above freezing, i.e., above 32° F. or 0° C.

As can be appreciated, the need to heat the ultra-high natural gas before delivery to the let down stations requires considerable energy and, therefore, reduces the overall efficiency of the gas distribution system. Also, the reduction in the gas pressure at the let down stations generates significant energy which to date has been untapped and wasted.

It is, therefore, an object of the present invention to provide a system and method for use in gas distributions systems which aims to provide an efficient and cost effective approach to reducing the pressure of gas supplied from extra-high pressure gas distribution/transmission lines.

It is also an object of the present invention to provide a system and method of the above type in which the energy generated in reducing the gas pressure is utilized to enhance system efficiencies.

It is also an object of the present invention to provide a system and method of the above type which utilizes components which contribute lesser amounts of contaminants to the atmosphere.

SUMMARY OF THE INVENTION

In the embodiments of the invention to be described hereinafter, the above and other objectives are realized in a fuel cell hybrid power generation system and method usable in a gas distribution system in which an extra-high pressure gas is transported/distributed and then reduced to a lower pressure for a gas distribution or transmission line and a pre-heater is used to heat the extra-high pressure gas before it is reduced in pressure. More particularly, the fuel cell hybrid power generation system has an energy recovery generator which is responsive to the pre-heated extra-high pressure gas and is adapted to reduce the gas pressure of the pre-heated extra-high pressure gas to produce the lower pressure gas while generating an electrical output. A fuel cell power plant is also included in the power generation system and is adapted to generate an electrical output while producing waste heat. The fuel cell power plant is further adapted to make the waste heat available to the pre-heater so as to enable the pre-heater to heat the extra-high pressure gas. An electrical unit or assembly in the power generation system is responsive to the electrical outputs of the energy recovery generator and the fuel cell power plant and generates a combined electrical output. Optionally, the fuel cell power plant is additionally adapted to utilize some of the lower pressure (or higher pressure) gas as the fuel supply for the plant.

In certain embodiments of the invention, the energy recovery generator is in the form of a rotary expansion device which reduces the pressure of the extra-high pressure gas by expansion resulting in a mechanical output which drives an electrical generator. In some of these embodiments, the fuel cell power plant utilizes fuel cell modules adapted to internally reform the input fuel supplied by the lower pressure gas. Optionally, the fuel cell modules may include stacks of internally reforming fuel cells and further, optionally, these fuels cells can be internally reforming molten carbonate fuel cells.

Also, in some embodiments the combined electrical output of the electrical assembly is made available to an electrical grid and/or loads. Additionally, in certain embodiments, the pre-heater utilizes a heat exchanger with a thermal heat transfer fluid loop for heating the extra-high pressure gas and the power plant flue gas includes oxidant exhaust gas which forms at least a portion of the waste heat of the power plant.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
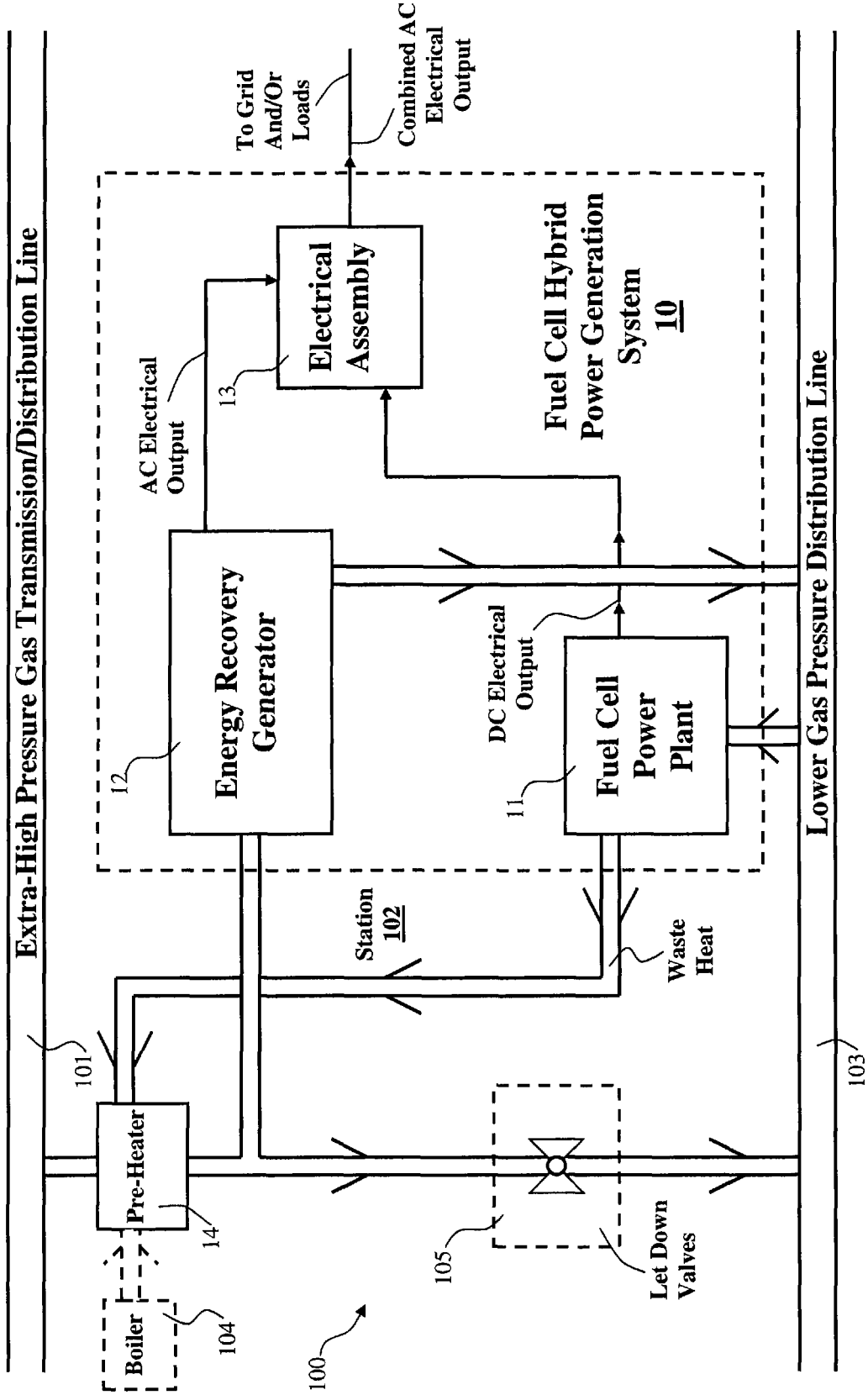
FIG. 1 shows a fuel cell hybrid power generation system used in a gas distribution system.

FIG. 1 shows schematically a fuel cell hybrid power generation system 10 used in conjunction with a gas distribution system 100. The gas distribution system 100 includes an extra-high pressure gas transmission or distribution line 101, which typically transports natural gas, at an extra-high pressure, to one or more pressure let down stations 102. At the let down station 102, the extra-high pressure gas is coupled from the line 101 and is reduced to a lower pressure, typically about 50-60 psig. The lower pressure gas is then coupled from the let down station 102 to one or more gas distribution lines 103 which deliver or make the gas available for delivery to user locations.

At the let down station 102, the fuel cell hybrid power generation system 10 provides the pressure reduction of the of the extra-high pressure gas supplied to the station from the line 101. The power generation system 10 employs a fuel cell power plant 11 which, in the case shown, is supplied gas from the distribution line 103 and is adapted to utilize this gas as fuel supply gas for the plant. More particularly, using this fuel supply gas and an oxidant supply gas, the fuel cell power plant 11, through electrochemical conversion, generates an electrical output which is fed to an electrical assembly or unit 13.

The electrochemical conversion process in the fuel cell power plant 11 also generates near-zero emission waste heat. This heat is provided to a pre-heater unit 14 which is used to heat the extra-high pressure gas from the line 101 before the gas is subject to pressure reduction by the fuel cell hybrid power generation system 10. In the illustrative case, the pre-heater is shown as included in the gas distribution system 100. Alternatively, the pre-heater 14, if not provided in the distribution system 100, can be included in the power generation system 10.

Once the extra-high pressure gas is pre-heated, the gas is coupled through appropriate lines or piping to an energy recovery generator 12 in the generation system 10. The energy recovery generator 12 reduces the pressure in the pre-heated extra-high pressure gas to the desired lower pressure and delivers the gas to the distribution line 103. Concurrently with and as a result of this pressure reduction, the energy recovery generator also generates an electrical output which is additionally fed to the electrical assembly 13.

The assembly 13 conditions and optimizes the electrical outputs of the fuel cell power plant 11 and the energy recovery unit 12. The system then makes the combined output available to one or more electrical loads and/or or to a power grid for eventual use by consumers.

With the gas distribution system 100 of FIG. 1 and, in particular, the pressure let down station 102 implemented by use of the fuel cell hybrid generation system 10, the overall efficiency of the gas distribution system 100 is improved. In particular, the reduction in gas pressure is accompanied by the generation of useful electrical power in the energy recovery generator 12 and this electrical power is coupled to the assembly 13 for eventual use. The electrical power from the energy recovery generator 12 is further supplemented by the steady and constant electrical power output of fuel cell power plant 11 so the resultant combined electrical power output from the assembly 13 can be reliably maintained at a desired minimum level. Also, the waste heat from the fuel cell power plant 11 is utilized in the pre-heater 14 so that the need to use a boiler for this purpose is lessened or completely replaced. Moreover, the near zero emission waste heat of the fuel cell power plant acts as an offset to any boiler emissions. Assembly 13 provides for additional system controls which optimize the emission reductions and system fuel efficiencies.

Figure 2:
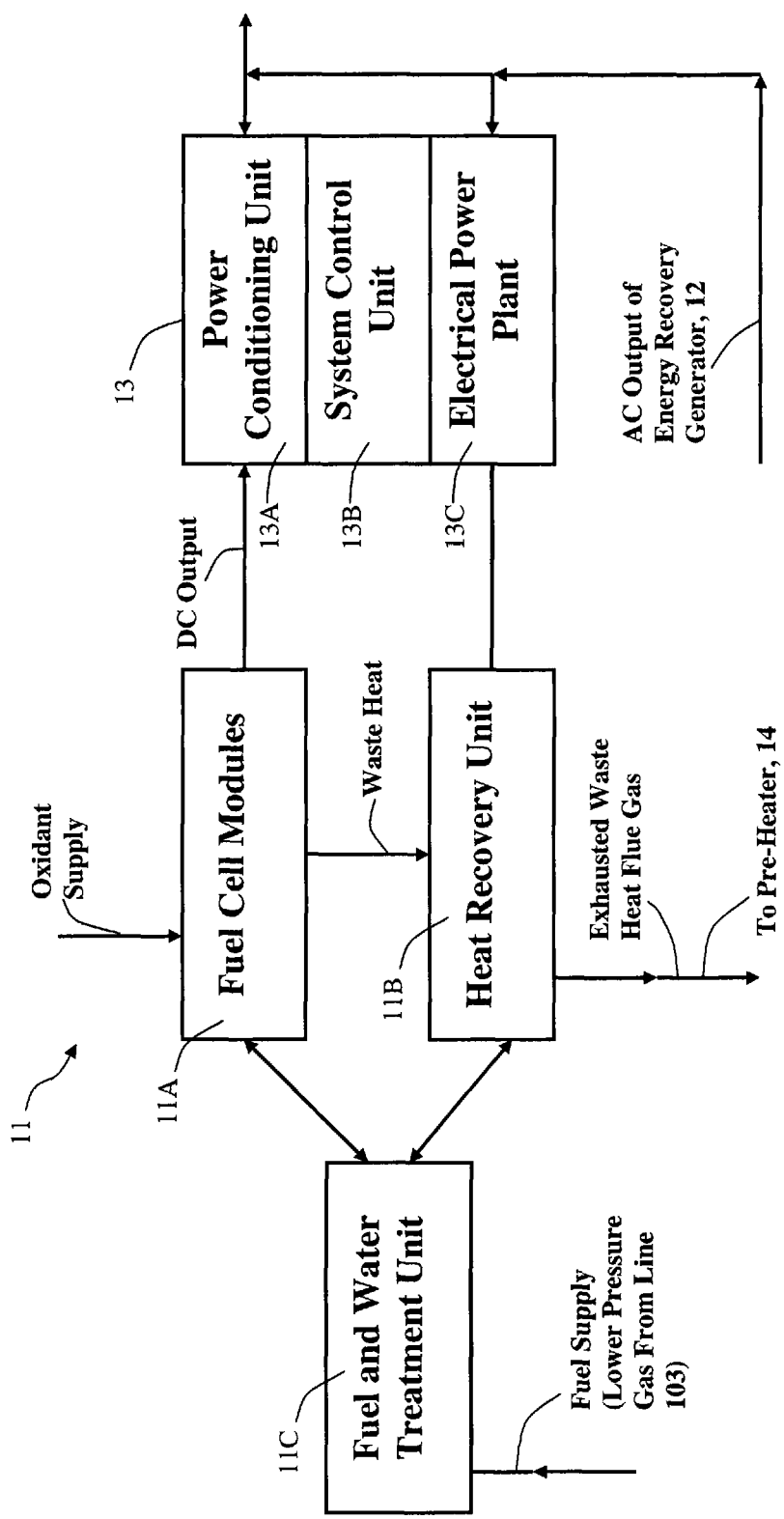
FIG. 2 shows the fuel cell power plant and electrical assembly of the generation system of FIG. 1 in greater detail.

FIG. 2 shows a schematic diagram of a fuel cell power plant 11 and electrical assembly 13 which is usable in certain embodiments of the invention. A shown, the power plant 11 includes a plurality of fuel cell modules 11A which form a DC power section. Each of the modules 11A is adapted optionally to operate directly with natural gas, methane or other hydrocarbon fuels as a fuel supply with little or no reforming; these gases can then be directly reformed within the fuel cell modules themselves. To this end, each module 11A can include one or more internally reforming stacks of fuel cells. Examples of usable internally reforming fuel cells are molten carbonate internally reforming fuel cells.

With the fuel cell modules reforming the fuel supply gas, the need for separate reforming units within the power plant 11 or elsewhere in the system is lessened. Direct reforming in the power plant 11 is also of significant benefit when used with the gas distribution system 100, since the lower pressure natural gas from the distribution line 103 can then be used as fuel supply gas for the fuel cell modules 11A.

Each fuel cell module 11A also produces waste heat. This waste heat includes oxidant exhaust gas and, as shown in FIG. 2, is coupled from the fuel cell modules 11A to a heat recovery unit 11B. The heat recovery unit 11B exhausts this waste heat as flue gas and, as above-discussed, this flue gas is used by the pre-heater 14 for pre-heating the extra-high pressure gas from the line 101. Prior to being exhausted, a portion of the waste heat is used to process the fuel supply and water supply after these supplies have been treated in a fuel and water treatment unit 11C also included in the power plant 11. The latter unit includes fuel clean-up and other fuel treatment reactors (e.g., de-oxidation reactors for peak shaving natural gas) for treating the fuel and water.

The treated fuel and water are processed to produce a fuel/steam mixture at an appropriate temperature for delivery to the fuel cell modules 11A. To this end, the unit 11B includes packaged catalytic reactors and cold oxidant (air) supply blowers with associated local controls.

A fuel cell power plant which can be used as the power plant 11 in FIG. 2 is currently manufactured by one of the assignees of the subject application, FuelCell Energy, Inc. under product designation DFC® 3000. Other power plants manufactured by such assignee under product designations DFC® 1500 and DFC300MA can also be adapted for use as the power plant 11.

Also, while internally reforming molten carbonate fuel cells are examples of one-type of fuel cell usable in the fuel cell modules 11A, the principles of the invention are intended to apply to all types of fuel cells. Thus, it is within the contemplation of the invention to use other types of both high and low temperature fuel cells, whether internally reforming or non-internally reforming in the modules 11A. Examples of usable fuel cells include, but are not limited to, the following: solid oxide fuel cells, phosphoric acid fuel cells and PEM fuel cells.

If the modules 11A contain non-internally reforming fuel cells, additional reforming equipment may have to be added to the fuel cell power plant 11 or elsewhere in the system to reform the fuel supply before it is fed to the fuel cell modules.

Figure 3:
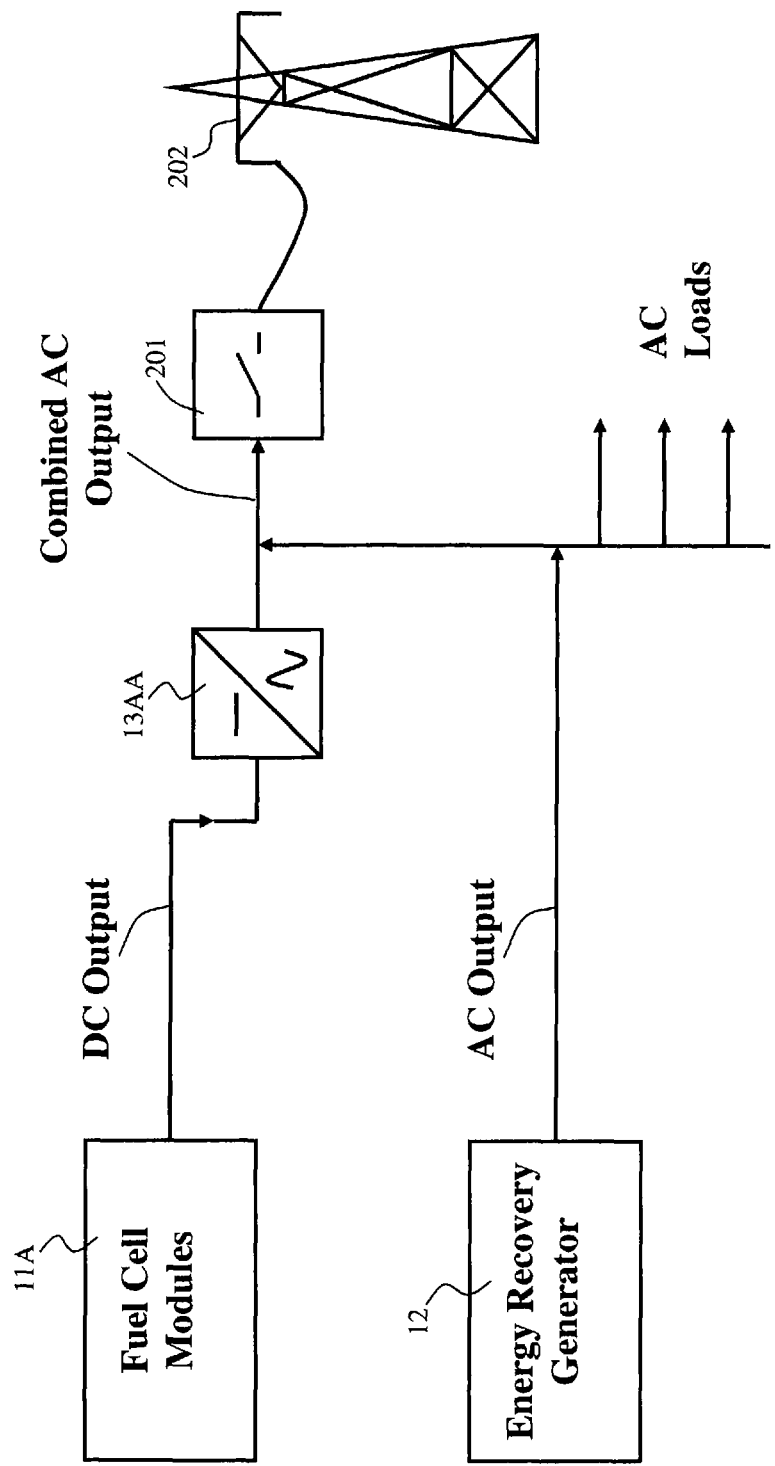
FIG. 3 shows the power conditioning system of the electrical assembly of FIG. 2 in greater detail.

Looking now at the electrical assembly 13, as shown in FIG. 2, it includes a power conditioning unit 13A, a system control unit 13B and an electrical power plant 13C. The power conditioning system 13A is shown in more detail in FIG. 3 and includes a DC to AC converter 13AA which converts the DC output of the fuel cell modules 11A into an AC output. As seen in FIG. 3, the electrical output of the energy recovery unit 12 is also fed to the output of the DC to AC converter 13AA where it is combined with the output of the converter. The combined output is then supplied to AC loads and/or to a grid unit 201. The latter unit, in turn, couples the AC output to a power line system 202 for eventual consumer use.

It should be noted that the power conditioning system 13A can be configured in other forms than that shown in FIG. 3. Thus, for example, instead of the AC output of the energy recovery generator 12 being supplied to the output of the DC to AC converter 13AA, it could have instead been converted from an AC output to a DC output and then combined with the output of the fuel cell modules at the input of the DC to AC converter 13AA. Another alternative would be to include a DC to DC converter at the output of the fuel cell modules 11A to raise the level of the DC output prior to the output being fed to the input of the converter 13AA. A third alternative, particularly, for smaller energy recovery generators, would be to provide a DC output from the energy recovery generator and then combine this output with the output of the fuel cell modules 11A at the input of the DC to AC converter 13AA.

The electrical power plant 13C of the assembly 13 includes equipment for supplying power to the heat recovery unit and other equipment in the fuel cell power plant 11. As shown, the plant 13C derives this power from a portion of the AC power from the energy recovery generator 12. Although not shown, additional power can be derived from a portion of the fuel cell module electrical output. The plant 13C also includes for backup a battery-supported uninterruptible power supply to maintain power for the control system and other plant components during voltage dips or interruptions.

The control system unit 13 C includes the basic controls for controlling the various components of the system. More particularly, the energy recovery generator's power profile is similar to wind power generation with variable output tied to varying resource availability from the recovered pipeline gas energy. The coupled electricity from the fuel cell stacks of the fuel cell power plant allows the fuel cell hybrid power generation system 10 firm its own generation profile with an optimized control system in assembly 13. The control system allows operating parameters for the fuel cell hybrid power hybrid generation system to be established on one of three operating modes including:
  (i) optimized electricity yield for maximum annual electricity production; or
  (ii) optimized fuel efficiencies, where output from the energy recovery generator is prioritized; or
  (iii) optimized emission reductions, where output from the fuel cell power plant is prioritized and the energy recovery generator output is matched to the available thermal output of the fuel cells of the fuel cell power plant.

Figure 4:
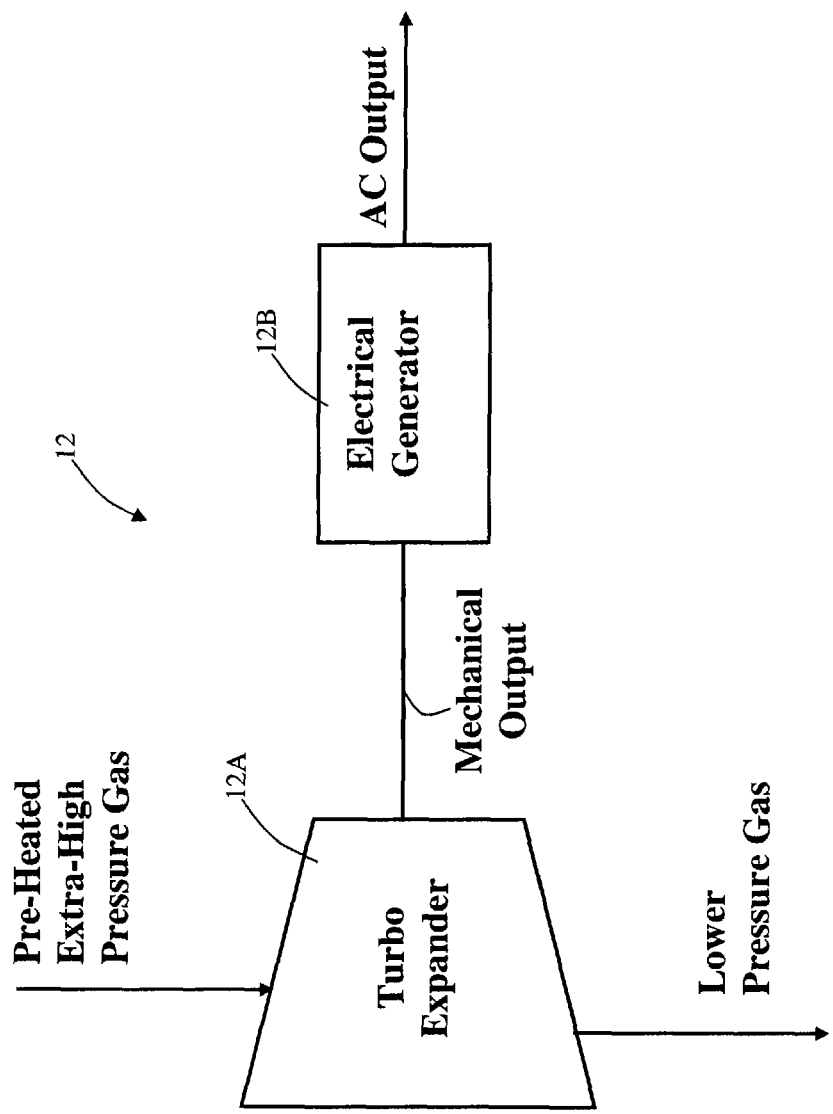
FIG. 4 shows the energy recovery generator of the system of FIG. 1 in greater detail.

FIG. 4 shows an energy recovery generator 12 useful with certain embodiments of the invention and, in particular with those using the fuel cell power plant shown in FIG. 2. As illustrated, the unit 12 includes a rotary expansion device (turbo expander or reciprocating expander) 12A and an electrical generator 12B driven by the mechanical output of the expansion device. The mechanical energy of the expansion device is derived from the expansion of the extra-high pressure gas with the resultant reduction in pressure. This drives the generator to result in an electrical output (AC or DC). A turbo expander manufactured by Cryostar under product designation TG-200/60-EX is an example of a turbo expander that can be used for rotary expansion device 12A of FIG. 3. The generator 12B, in turn, can be a unit manufactured by Alsthom under the product designation F2RTCN450L2C.

It is also within the contemplation of the invention to use other energy recovery generators for the generator 12. Thus, for example, other expansion recovery machinery currently produced as commercial, early commercial, demonstration, or prototype units from various manufacturers, or ones under development but not currently produced, could also be used. Any device which permits the recovery of waste energy from the let down of gas pressure at the pipeline pressure let down station 102 for the conversion of the energy into useful electricity generation can be used for the energy recovery generator 12.

The pre-heater system 14 shown in FIG. 1 can be standard pre-heater including a heat exchanger with a standard liquid to gas, or gas to gas, thermal heat transfer fluid loop. In such case, the heat exchanger receives the waste heat from the power plant 11 to heat the thermal fluid loop. The heated thermal fluid then proceeds around its loop path and gives up its heat to the extra-high pressure gas to provide the desired pre-heating of the gas. The thermal fluid then continues around its path to be heated by the waste heat again and the process continues so that the extra-high pressure gas is continuously pre-heated as it passes through the heat exchanger.

A shown in FIG. 1, the system 100 may also include a boiler 104 and let down valves 105. These components are provided as backups to the fuel cell hybrid generation system 10 and can be brought in service to provide heat into the pre-heater 14 and to provide pressure reduction for the gas in the line 101 during the maintenance of or other interruptions in the power generation system 10.

In all cases it is understood that the above-described arrangements are merely illustrative of the many possible specific embodiments, which represent applications of the present invention. Numerous and varied other arrangements can be readily devised in accordance with the principles of the present invention without departing from the spirit and the scope of the invention. Thus, for example, while in the embodiment of the invention shown in FIG. 1, the fuel cell power plant is supplied fuel gas from the low pressure gas distribution line 103, it can also be supplied fuel gas at a higher pressure from the line 101 or be supplied fuel gas from a seal leakage system that is designed or built into the energy recovery generator 12. It is also noted that the pressures and pressure ranges given herein for the extra-high pressure gas and the lower pressure gas are intended to be illustrative examples only and the invention is not intended to be limited thereby and is intended to cover any and all systems in which there is a reduction and/or let down of gas pressure from a higher to a lower pressure.

We claim:

1. A method of generating hybrid energy utilizing a gas distribution system in which an extra-high pressure fuel gas is transported/distributed and then reduced to a lower pressure for a fuel gas distribution or transmission line, the method comprising:
   pre-heating the extra-high pressure fuel gas before it is reduced in pressure; using an energy recovery generator to reduce the pressure of the pre-heated extra-high pressure fuel gas to produce the lower pressure fuel gas and to generate an electrical output;using a fuel cell power plant to generate an electrical output, while generating said electrical output, using said fuel cell power plant to produce waste heat and making said waste heat available in said pre-heating step to be used in said pre-heating step to heat the extra-high pressure fuel gas without using combustion to provide any of the waste heat of the fuel cell power plant to pre-heat the extra-high pressure fuel gas; and combining the electrical outputs of the energy recovery generator and the fuel cell power plant to generate a combined electrical output; wherein the method is used with the gas distribution system in which the extra- high pressure fuel gas is transported/distributed and then reduced to a lower pressure for a fuel gas distribution or transmission line.

2. A method in accordance with claim 1, further comprising:
making said combined electrical output available to one or more of a power grid and a load.

3. A method in accordance with claim 1, wherein:
said energy recovery generator comprises a rotary expansion device and an electrical generator coupled to said rotary expansion device; and
said fuel cell power plant comprises a fuel cell module which is adapted to receive a fuel supply gas and an oxidant supply gas and, through electrochemical conversion of said fuel supply gas and said oxidant supply gas, produce said electrical output and said waste heat.

4. A method in accordance with claim 3, wherein:
said rotary expansion device comprises one of a turbo expander and a reciprocating expander.

5. A method in accordance with claim 3, wherein:
said fuel cell power plant outputs a flue gas containing exhausted oxidant gas which forms at least a portion of the waste heat of said fuel cell power plant made available to said pre-heater;
said fuel cell supply gas includes one of said lower pressure gas, said extra-high pressure fuel gas, and gas supplied through the recovery of seal leakage gas originating from the energy recovery generator; and
said fuel cell module comprises one or more of: one or more stacks of internally reforming fuel cells; and one or more stacks of non-internally reforming fuel cells.

6. A method in accordance with claim 5, wherein:
each of said fuel cells comprises one of a high temperature fuel cell, a low temperature fuel cell, a molten carbonate fuel cell, a solid oxide fuel cell, a phosphoric acid fuel cell and a PEM fuel cell.

7. A method in accordance with claim 5, wherein:
said pre-heating comprises heat exchanging with a thermal heat transfer fluid loop said extra-high pressure fuel gas to pre-heat said extra-high pressure fuel gas via said thermal heat transfer fluid loop;
and making available said oxidant flue gas to said heat exchanging step to heat said thermal heat transfer fluid.

8. A method in accordance with claim 7, wherein:
said thermal heat transfer fluid loop comprises a glycol loop.

9. A method in accordance with claim 1, wherein:
said low pressure gas has a pressure in the range of 50-80 psig;
and said extra-high pressure fuel gas has a pressure is the range of two to twenty times higher than the pressure of said low pressure gas.

\* \* \* \* \*